(12) United States Patent
Song et al.

(10) Patent No.: US 9,650,567 B2
(45) Date of Patent: May 16, 2017

(54) WAVELENGTH CONVERTER AND LIQUID CRYSTAL DISPLAY INCLUDING THE SAME

(71) Applicant: Samsung Display Co., Ltd., Yongin (KR)

(72) Inventors: Hyun Hwa Song, Suwon-si (KR); Dong Hoon Kim, Suwon-si (KR); Sang Chul Byun, Anyang-si (KR); Sang Hoon Lee, Hwaseong-si (KR); Seung Hwan Chung, Asan-si (KR); Han Moe Cha, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 155 days.

(21) Appl. No.: 14/245,814

(22) Filed: Apr. 4, 2014

(65) Prior Publication Data
US 2015/0176804 A1 Jun. 25, 2015

(30) Foreign Application Priority Data
Dec. 20, 2013 (KR) ........................ 10-2013-0160453

(51) Int. Cl.
*G02F 1/1335* (2006.01)
*C09K 11/08* (2006.01)
*F21V 8/00* (2006.01)

(52) U.S. Cl.
CPC ........ *C09K 11/08* (2013.01); *G02F 1/133615* (2013.01); *G02B 6/0055* (2013.01);
(Continued)

(58) Field of Classification Search
CPC ......... G02F 1/133615; G02F 1/133603; G02F 2001/01791; G02F 2001/133614; G02B 6/0055; Y10T 428/24479; C09K 11/08
(Continued)

(56) References Cited

U.S. PATENT DOCUMENTS 7,262,758 B2 8/2007 Kahen et al.
8,085,467 B1 12/2011 Silverstein et al.
(Continued)

FOREIGN PATENT DOCUMENTS

KR 10-1114412 2/2012
KR 10-1156096 6/2012
(Continued)

*Primary Examiner* — Nathanael R Briggs
*Assistant Examiner* — William Peterson
(74) *Attorney, Agent, or Firm* — H.C. Park & Associates, PLC

(57) ABSTRACT

A wavelength converter and a liquid crystal display having the same, the wavelength converter including a first pattern that converts a wavelength of light into red light, and a second pattern that converts a wavelength of light into green light. The first pattern and the second pattern are alternately disposed, and an optical path length $L_a$ of each of the first pattern and the second pattern is given by Equation (1):

$$L_a = (\lambda_a/2) \times m,$$

wherein $L_a$ is an optical length of an a-th pattern, $\lambda_a$ is a wavelength of light converted by the a-th pattern, a is one or two, and m is a natural number.

20 Claims, 25 Drawing Sheets

(52) U.S. Cl.
CPC .............. *G02F 2001/133614* (2013.01); *Y10T 428/24479* (2015.01)

(58) Field of Classification Search
USPC .......................................................... 349/61
See application file for complete search history.

(56) References Cited

U.S. PATENT DOCUMENTS

| | | |
|---|---|---|
| 2005/0046336 A1 | 3/2005 | Utsumi et al. |
| 2011/0256648 A1* | 10/2011 | Kelley ................... H01L 33/08 438/29 |
| 2012/0113672 A1 | 5/2012 | Dubrow et al. |
| 2012/0154464 A1 | 6/2012 | Ninan et al. |
| 2012/0256163 A1* | 10/2012 | Yoon ................. G02F 1/133603 257/13 |
| 2012/0287381 A1 | 11/2012 | Li et al. |
| 2013/0294107 A1* | 11/2013 | Ohkawa ............ G02F 1/133615 362/606 |

FOREIGN PATENT DOCUMENTS

| | | |
|---|---|---|
| KR | 10-2012-0088273 | 8/2012 |
| KR | 10-2013-0015847 | 2/2013 |
| KR | 10-1273099 | 6/2013 |
| KR | 10-2013-0080333 | 7/2013 |
| KR | 10-1294770 | 8/2013 |
| KR | 10-1336831 | 11/2013 |

* cited by examiner

WAVELENGTH CONVERTER AND LIQUID CRYSTAL DISPLAY INCLUDING THE SAME

This application claims priority from Korean Patent Application No. 10-2013-0160453 filed on Dec. 20, 2013 in the Korean Intellectual Property Office, the disclosure of which is incorporated herein by reference in its entirety.

BACKGROUND

Field

Aspects of the present invention relate to a wavelength converter and a liquid crystal display (LCD) including the same.

Discussion of the Background

Liquid crystal displays (LCDs) are of great importance in information display technology. An LCD includes liquid crystals inserted between two glass substrates. The LCD displays information by using electrodes disposed on the glass substrates to control the orientation of the liquid crystals. Here, a color filter included in the LCD passes light of a particular wavelength band only, and realizes various colors by combining the light, so that the various colors can be seen by a viewer.

The color filter generally includes red, green and blue filters, and passes light of a wavelength band having a color of a corresponding region only. Currently, research is being conducted to increase the color purity of light emerging from the color filter, by using quantum dots.

A quantum dot, which is a nano-sized semiconductor material, exhibits a quantum confinement effect. The quantum dots emit stronger light than typical phosphors in a narrow wavelength band. The emission of the quantum dots occurs when excited electrons move from a conduction band to a valence band. Although the quantum dots are formed of the same material, the wavelength of emitted light may vary with the size of the quantum dot. As the size of the quantum dot is smaller, light having a shorter wavelength is emitted. Thus, light having a desired wavelength region can be obtained by adjusting the size of the quantum dot.

The quantum dot emits light even at a corresponding excitation wavelength. Thus, when several kinds of quantum dots exist, various colored light can be observed at a time, even though each quantum dot emits at a single wavelength. Furthermore, since the quantum dot only moves from a ground vibration state of the conduction band to a ground vibration state of the valence band, the emission wavelength is almost monochromatic light. When the quantum dot is used, a desired color can be obtained by adjusting the concentration or size of the quantum dots, as compared with when phosphors are used.

However, even when quantum dots are used, since light of wavelength regions of two or more colors is emitted, color mixing may occur in an area where wavelength bands of different colors are adjacent to each other. Accordingly, a wavelength band in which color purity is reduced may exist, making it difficult to realize a high-purity color.

SUMMARY OF THE INVENTION

Aspects of the present invention provide a wavelength converter that converts light from a light source into high-purity red, green, and blue light.

Additional features of the invention will be set forth in the description which follows, and in part will be apparent from the description, or may be learned by practice of the invention.

According to an aspect of the present invention, there is provided a wavelength converter comprising a first pattern that converts a wavelength of light into red light, and a second pattern that converts a wavelength of light into green light. The first pattern and the second pattern are alternately disposed, and an optical path length $L_a$ of each of the first pattern and the second pattern is given by Equation (1):

$$L_a = (\lambda_a/2) \times m, \qquad (1)$$

In Equation (1), $L_a$ is an optical length of an a-th pattern, $\lambda_a$ is a wavelength of light converted by the a-th pattern, a is one or two, and m is a natural number.

The wavelength converter may further comprise a third pattern that converts a wavelength of light into blue light. The first through third patterns are alternately disposed, and an optical path length $L_3$ of the third pattern is given by Equation (2):

$$L_3 = (\lambda_3/2) \times m,$$

In Equation (2), $L_3$ is the optical path length of the third pattern, $\lambda_3$ is a wavelength of light converted by the third pattern, and m is a natural number.

The wavelength converter may further comprise a fourth pattern that converts a wavelength of light into blue light, wherein the first pattern, the second pattern and the fourth pattern are alternately disposed, and an optical path length $L_4$ of the fourth pattern is given by Equation (3):

$$L_4 = (\lambda_4/2) \times m,$$

In Equation (3), $L_4$ is the optical path length of the fourth pattern, $\lambda_4$ is a wavelength of light converted by the fourth pattern, and m is a natural number.

According to another aspect of the present invention, there is provided a liquid crystal display (LCD) comprising a light source, a wavelength converter, and an image display unit. The wavelength converter comprises a first pattern that converts a wavelength of light into red light, and a second pattern which converts a wavelength of light into green light. The first pattern and the second pattern are alternately disposed, and an optical path length $L_a$ of each of the first pattern and the second pattern is given by Equation (1):

$$L_a = (\lambda_a/2) \times m$$

In Equation (1), $L_a$ is an optical length of an a-th pattern, $\lambda_a$ is a wavelength of light converted by the a-th pattern, a is one or two, and m is a natural number.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE INVENTION

Figure 1:
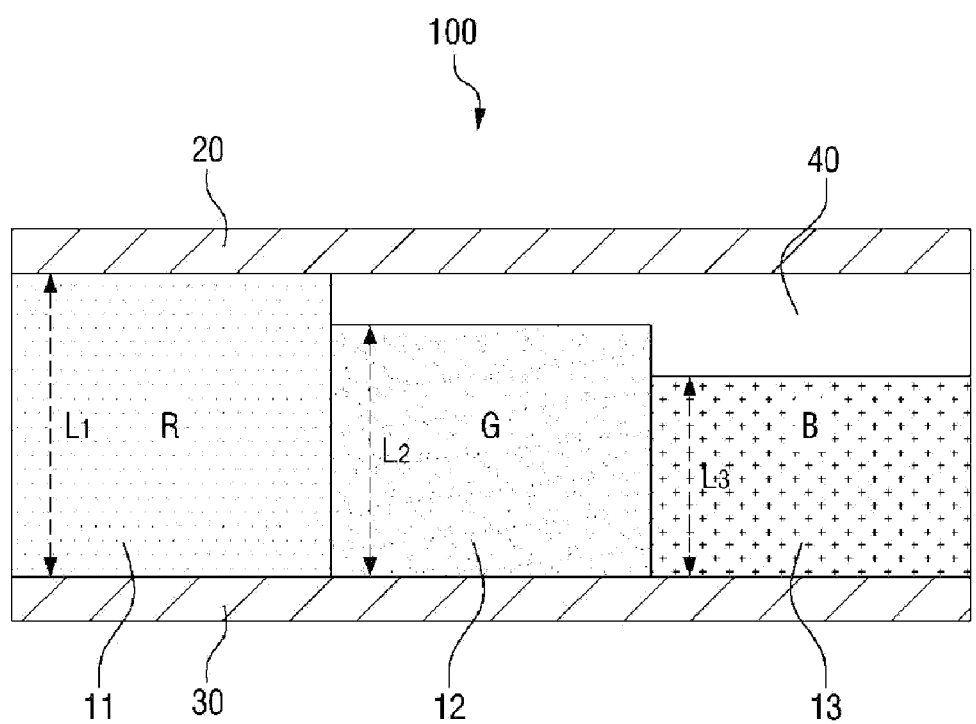
FIG. 1 is a cross-sectional view of a wavelength converter according to an embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

FIG. 1 is a cross-sectional view of a wavelength converter 100 according to an embodiment of the present invention. Referring to FIG. 1, the wavelength converter 100 according to the current embodiment includes a first pattern 11 that converts a wavelength of light into red light, and a second pattern 12 that converts a wavelength of light into green light. The first pattern 11 and the second pattern 12 are alternately disposed. An optical path length $L_a$ of each of the first pattern 11 and the second path 12 may be given by Equation (1):

$$L_a = (\lambda_a/2) \times m$$

In Equation (1), $L_a$ is an optical length of an $a^{th}$ pattern, $\lambda_a$ is a wavelength of light converted by the $a^{th}$ pattern, a is one or two, and m is a natural number.

$L_a$ indicates the optical path length of each pattern. In FIG. 1, the optical path length of the first pattern 11 is indicated by $L_1$, and the optical path length of the second pattern 12 is indicated by $L_2$. That is, $L_1$ is the optical path length of the first pattern 11 that converts a wavelength of light into red light, and $L_2$ is the optical path length of the second pattern 12 that converts a wavelength of light into green light. More specifically, a portion of light incident on the wavelength converter 100 transmits through a semi-transmissive member disposed on a pattern, and the other portion of the light is repeatedly reflected. Here, a gap between the semi-transmissive members disposed on and under the pattern is defined as an optical path length.

For example, the optical path length $L_1$ of the first pattern 11 satisfies $L_1=(\lambda_1/2) \times m$, where $\lambda_1$ is a wavelength of red light, i.e., a wavelength band of light converted by the first pattern 11, and m is a natural number. Red light may have a wavelength range of 600 to 670 nm and may have a peak within a range of approximately 618 to 635 nm. According to the above equation, the optical path length $L_1$ of the first pattern 11 may be a natural number multiple of 300 to 335 nm. Like the first pattern 11, the second pattern 12 converts a wavelength of light into green light. Green light may have a wavelength range of 500 to 570 nm and may have a peak within a range of approximately 516 to 533 nm. Therefore, the optical path length $L_2$ of the first pattern 12 may be a natural number multiple of 250 to 285 nm.

If the optical path length $L_1$ or $L_2$ of each of the first pattern 11 and the second pattern 12 is designed to be a natural number multiple (m) of half ($\lambda_a/2$) of $\lambda_a$, which is a desired wavelength range of light to be emitted, each of the first pattern 11 and the second pattern 12 may transmit light having the wavelength of $\lambda_a$ and reflect light having other wavelengths, in a direction in which the light was incident, according to the Fabry-Perot Optical Cavity principle. In addition, light inside the wavelength converter 100 may be reflected a number of times to travel in a path in which light in the wavelength of $\lambda_a$ is mostly transmitted through the wavelength converter 100. Accordingly, the purity of the light in the wavelength of $\lambda_a$ is increased. That is, a wavelength of light in a desired wavelength band is made sharper. Furthermore, light located in a wavelength range of a boundary of each color is reflected. As a result, light having a high-purity color may be emitted.

More specifically, the first pattern 11 is designed to emit high-purity red light. Therefore, the optical path length $L_1$ of the first pattern 11 may be set to a range of 300 to 335 nm, which is half a wavelength range of red light. In addition, the second pattern 12 is designed to emit green light. Therefore, the optical path length $L_2$ of the second pattern 12 may be set to a range of 250 to 285 nm, which is half a wavelength range of green light. In the first pattern 11, light outside the wavelength range of red light is reflected, such that light within the wavelength range of the red light can be emitted with high purity. In the second pattern 12, light outside the wavelength range of green light is reflected, such that light within the wavelength range of the green light can be emitted with high purity.

The wavelength converter 100 of the present invention further includes a third pattern 13 that converts a wavelength of light into blue light. The first through third patterns 11 through 13 may be alternately disposed, and an optical path length $L_3$ of the third pattern 13 may be given by Equation (2):

$$L_3 = (\lambda_3/2) \times m$$

In Equation (2), $L_3$ is the optical path length of the third pattern 13, $\lambda_3$ is a wavelength of light converted by the third pattern 13, and m is a natural number.

The third pattern 13 may convert a wavelength of light into blue light. Blue light may have a wavelength range of 420 to 480 nm and may have a peak within a range of approximately 440 to 465 nm. Therefore, the optical path length $L_3$ of the third pattern 13 may be a natural number multiple of 210 to 240 nm. The principle of increasing color purity using the third pattern 13 is the same as the above-described principle of increasing color purity using each of the first pattern 11 and the second pattern 12, and thus, a detailed description thereof will be omitted.

Each of the first through third patterns 11 through 13 may include a fluorescent material or quantum dots. The fluorescent material may be a yellow, green, or blue fluorescent material. Examples of the yellow fluorescent material may include a YAG-based fluorescent material such as $(Y_{1-x-y}Gd_xCe_y)_3Al_5O_{12}$, $(Y_{1-x}Ce_x)_3Al_5O_{12}$, $(Y_{1-x}Ce_x)_3(Al_{1-y}Ga_y)_5O_{12}$, or $(Y_{1-x-y}Gd_xCe_y)_3(Al_{1-z}Ga_z)_5O_{12}$; a silicate-based fluorescent material such as $(Sr,Ca,Ba,Mg)_2SiO_4$:Eu; and an oxynitride fluorescent material such as $(Ca,Sr)Si_2N_2O_2$:Eu. Examples of the green fluorescent material may include $Y_3(Al,Ga)_5O_{12}$:Ce, $CaSc_2O_4$:Ce, $Ca_3(Sc,Mg)_2Si_3O_{12}$:Ce, $(Sr,Ba)_2SiO_4$:Eu, $(Si,Al)_6(O,N)_8$:Eu($\beta$-sialon), $(Ba,Sr)_3Si_6O_{12}N_2$:Eu, $SrGa_2S_4$:Eu, and $BaMgAl_{10}O_{17}$:Eu,Mn. Examples of the red fluorescent material may include $(Ca,Sr,Ba)_2Si_5(N,O)_8$:Eu, $(Ca,Sr,Ba)Si(N,O)_2$:Eu, $(Ca,Sr,Ba)AlSi(N,O)_8$:Eu, $(Sr,Ba)_3SiO_5$:Eu, $(Ca,Sr)S$:Eu, $(La,Y)_2O_2S$:Eu, and $K_2SiF_6$:Mn.

The quantum dots are semiconductor nanoparticles and are several to tens of nm in size. The quantum dots emit different light according to the particle size thereof, due to the quantum confinement effect. More specifically, the quantum dots generate strong light in a narrow wavelength band, and the emission of the quantum dots occurs when unstable (excited) electrons fall from a conduction band to a valence band. The quantum dots tend to generate light having a shorter wavelength when the particle size is smaller, and generate light having a longer wavelength when the particle size is larger. Therefore, light of all desired visible wavelengths can be generated by controlling the size of the quantum dots.

The quantum dots may include at least one of Si nanocrystals, group II-VI compound semiconductor nanocrystals, group III-V compound semiconductor nanocrystals, and group IV-VI compound semiconductor nanocrystals.

The group II-VI compound semiconductor nanocrystals may include at least one selected from CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

The group III-V compound semiconductor nanocrystals may be at least one selected from GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The group IV-VI compound semiconductor nanocrystals may be SbTe.

As described above, the quantum dots generate light of a shorter wavelength when the particle size is smaller, and generate light of a longer wavelength when the particle size is larger. Therefore, the particle size of the quantum dots may be adjusted to 55 to 65 Å in order to generate red light, to 40 to 50 Å in order to generate green light, and to 20 to 35 Å in order to generate blue light.

The fluorescent material or the quantum dots may be dispersed in a naturally coordinated manner in a dispersing medium, such as an organic solvent or polymer resin. The dispersing medium may be any transparent medium that does not reflect or absorb light without affecting the wavelength conversion performance of the quantum dots or the fluorescent material.

The organic solvent may include at least one of toluene, chloroform, and ethanol. The polymer resin may include at least one of an epoxy, polystyrene, and an acrylate.

The wavelength converter 100 may further include a first substrate 20 and a second substrate 30 having the first pattern 11 and the second pattern 12 interposed therebetween. If the third pattern 13 is further provided, the first through third patterns 11 through 13 may be interposed between the first substrate 20 and the second substrate 30.

Each of the first substrate 20 and the second substrate 30 may be formed of a semi-transmissive member. The semi-transmissive member may be any material that can transmit a portion of light and reflects the other portion of the light, such as $Si_3N_4$, SiO, $WO_3$, ZnS, or $TiO_2$.

Since each of the first and second substrates 20 and 30 is formed of the semi-transmissive member, a portion of light is transmitted through the first and second substrates 20 and 30, and the other portion of the light is reflected within each pattern. Here, since each pattern is formed according to the designed optical path length $\lambda_a$, light in a desired wavelength band is emitted, whereas light in other wavelengths is filtered out by reflection within each pattern. Therefore, the purity of the light in the desired wavelength band can be increased.

In another embodiment of the present invention, any one of the first substrate 20 and the second substrate 30 may be formed of, or may include, a reflective member. A substrate formed of the reflective member may only reflect light. The reflective member may be a layer formed of a material selected from the group consisting of Ag, Al, Rh, Pd, Pt, Ru, a Pt group element, and alloys of the same.

The wavelength converter 100 of the present invention may further include an optical path adjuster 40 that adjusts the optical path length of any one or more of the first pattern 11 and the second pattern 12. In FIG. 1, the optical path adjuster 40 is formed between the second and third patterns 12 and 13, and the first substrate 20. The optical path adjuster 40 may also be formed between the first pattern 11 and the second substrate 30, or between the first through third patterns 11 through 13 and the first substrate 20. The optical path adjuster 40 may be located at an appropriate position in the wavelength converter 100, in order to adjust the optical path length of each of the first through third patterns 11 through 13. The positions of the optical path adjuster 40 will be described later.

The optical path adjuster 40 may be formed of a semi-transmissive member, such that the optical path lengths of the first through third patterns 11 through 13 can satisfy Equation (1). The optical path adjuster 40 may be formed of a semi-transmissive member or a reflective member, or may be formed of the same material as the first substrate 20 or the second substrate 30. The optical path adjuster 40 can be placed at any position, as long as it can adjust the optical path lengths of the first through third patterns 11 through 13. According to some embodiments, the optical path adjuster 40 can be omitted.

FIGS. 2 through 5 illustrate other various embodiments of the wavelength converter 100 of the present invention. Referring to FIGS. 2 through 5, first, second, and third patterns 11, 12, and 13 are interposed between a first substrate 20 and a second substrate 30, and have thicknesses that satisfy optical path lengths $L_1$, $L_2$, and $L_3$, respectively.

Figure 2:
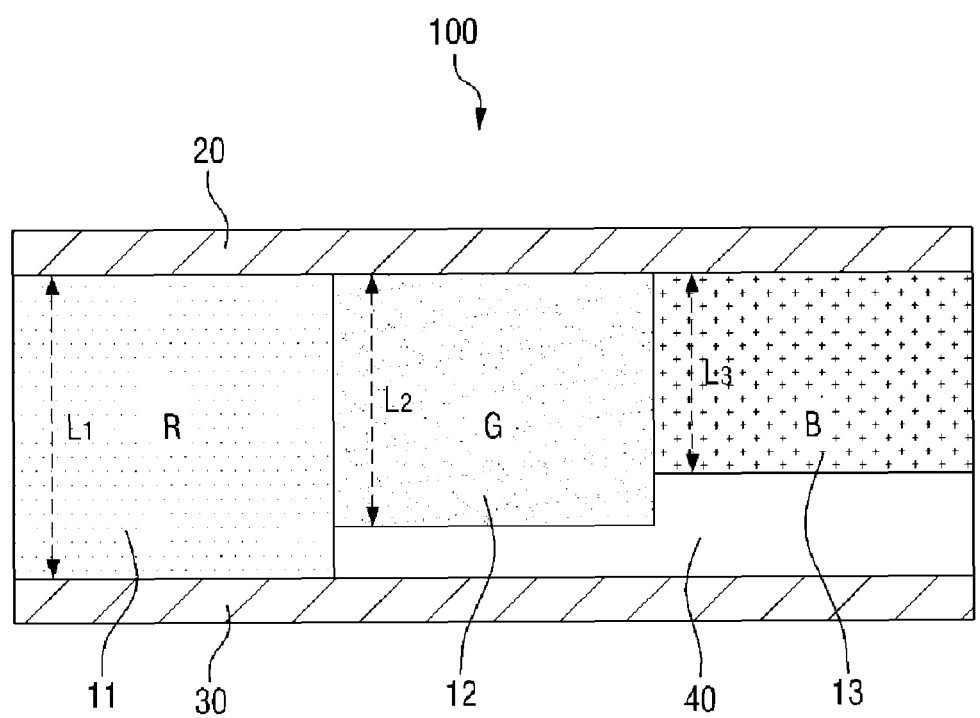
FIG. 2 is a cross-sectional view of a wavelength converter according to another embodiment of the present invention.
Figure 3:
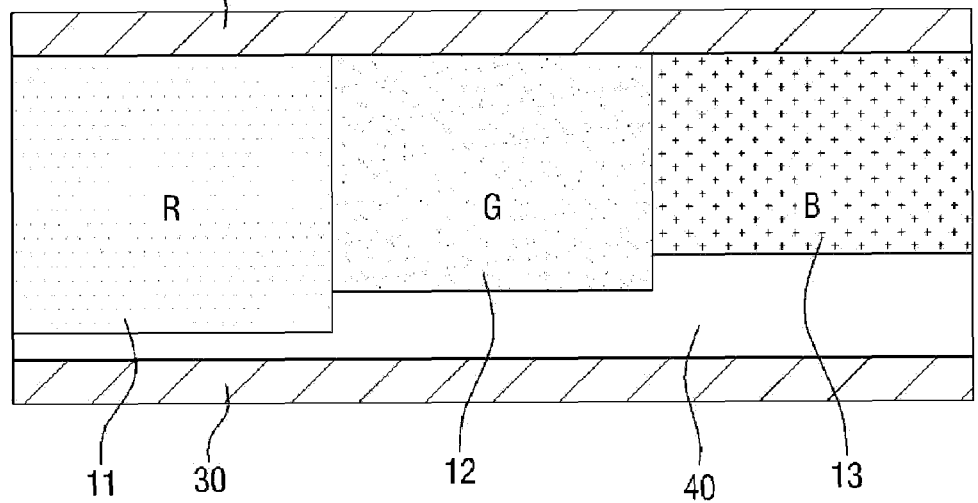
FIG. 3 is a cross-sectional view of a wavelength converter according to another embodiment of the present invention.
Figure 4:
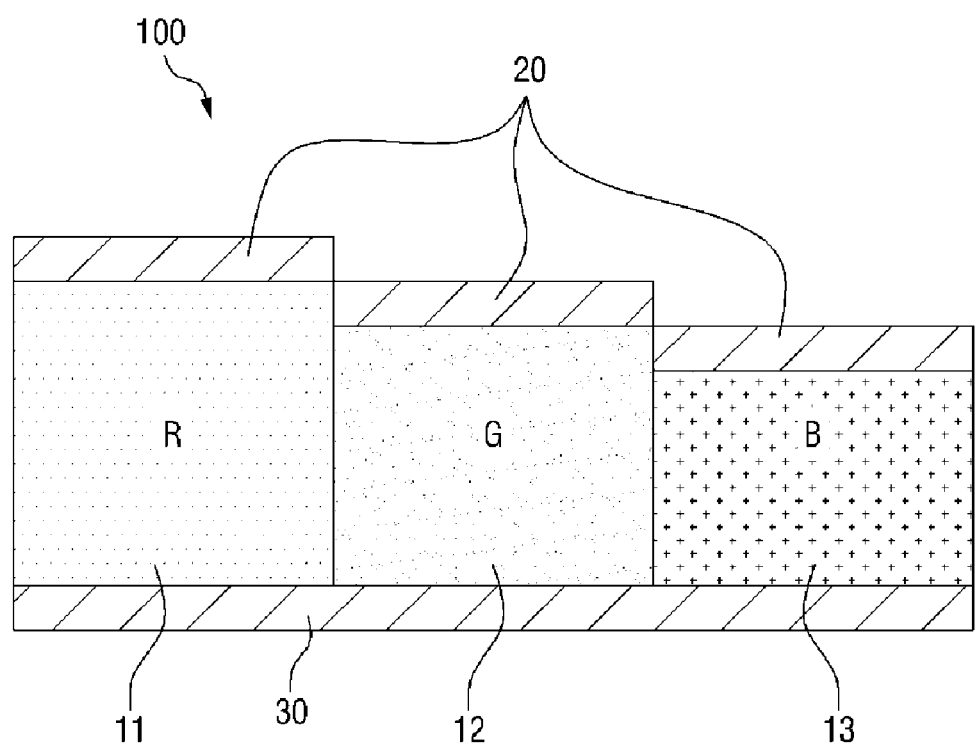
FIG. 4 is a cross-sectional view of a wavelength converter according to another embodiment of the present invention.

In a wavelength converter 100 of FIG. 2, the patterns 11, 12, and 13 are formed on a surface of the first substrate 20, and an optical path adjuster 40 is formed in a space between the second and third patterns 12 and 13, and the second substrate 30. In a wavelength converter 100 of FIG. 3, an optical path adjuster 40 is formed also between the first pattern 11 and the second substrate 30. In a wavelength converter 100 of FIG. 4, the patterns 11, 12, and 13 are interposed between the first substrate 20 and the second substrate 30, without an optical path adjuster.

Figure 5:
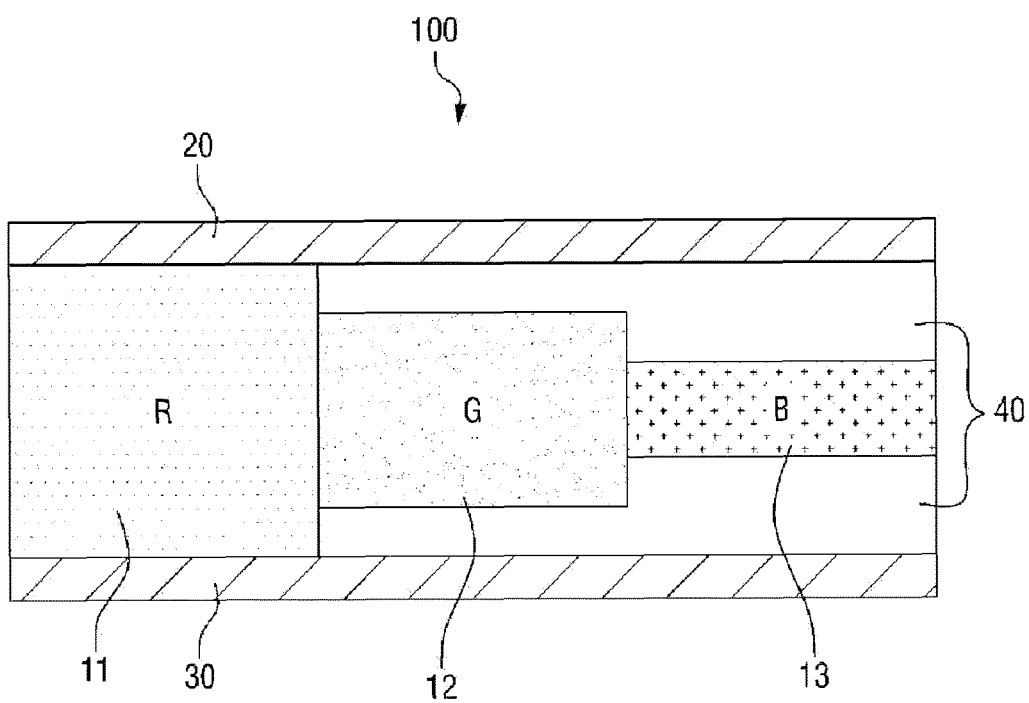
FIG. 5 is a cross-sectional view of a wavelength converter according to another embodiment of the present invention.

The wavelength converter 100 may have other structures than the structures shown in the above examples. The wavelength converter 100 may also be structured as illustrated in FIG. 5. Referring to FIG. 5, an optical adjuster 40 is formed between the second and third patterns 12 and 13, and the first substrate 20, and between the second and third patterns 12 and 13, and the second substrate 30. That is, the wavelength converter 100 should satisfy an optical path length corresponding to light of each color. To this end, an appropriate adjustment may be made by, for example, changing the position of any one or more of the first substrate 20, the second substrate 30, and the optical path adjuster 40, or by removing any one or more of the first substrate 20, the third substrate 30, and the optical path adjuster 40.

Figure 6:
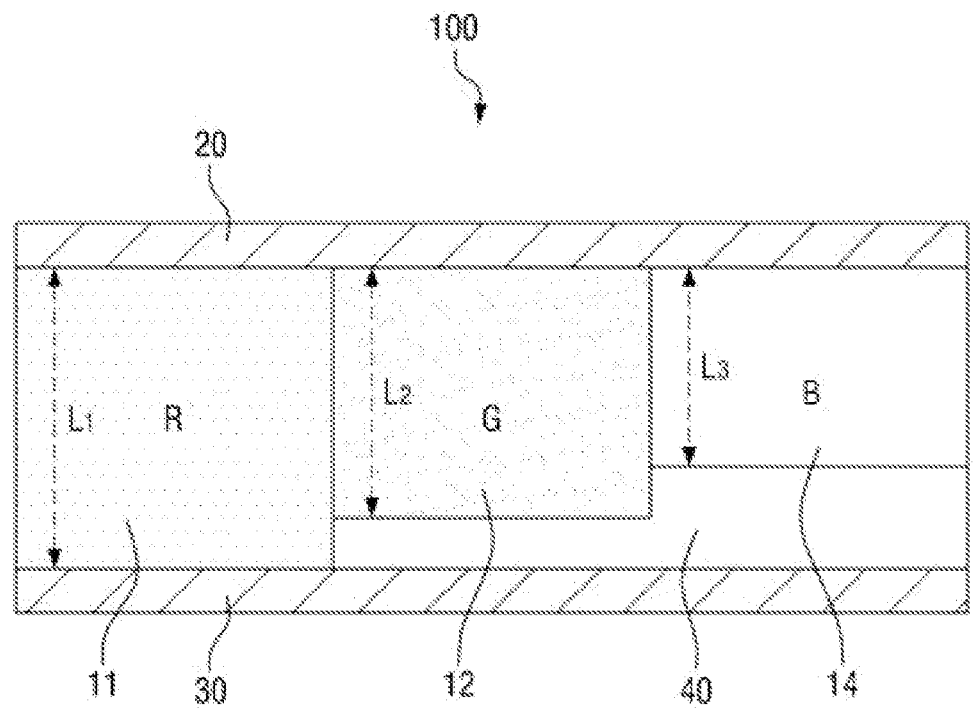
FIG. 6 is a cross-sectional view of a wavelength converter according to another embodiment of the present invention.
Figure 7:
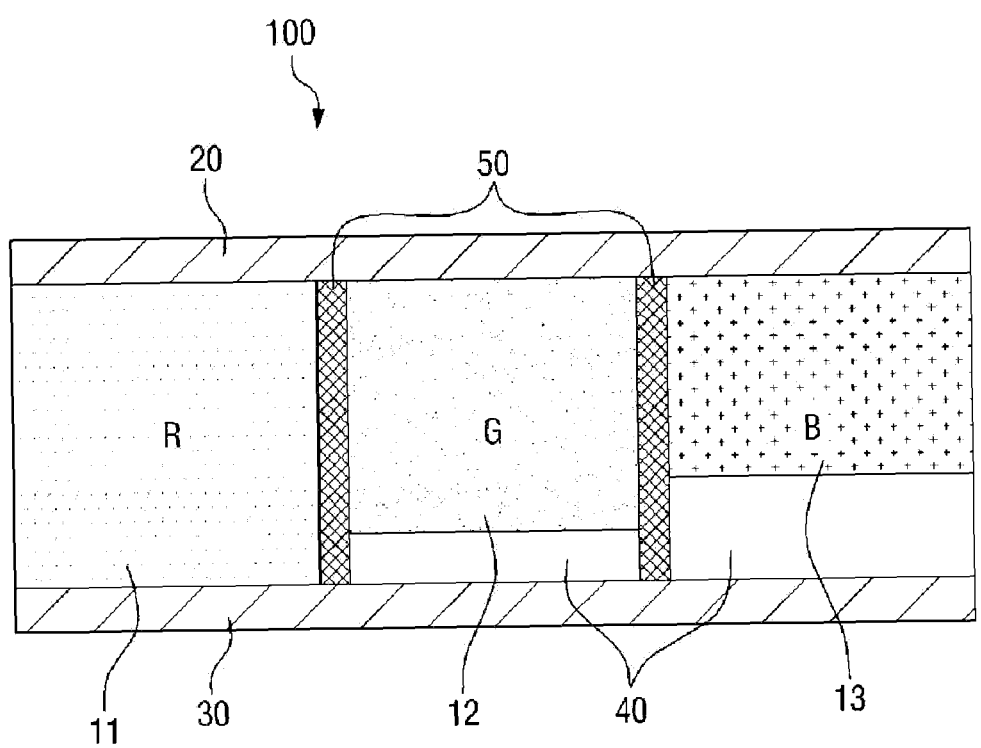
FIG. 7 is a cross-sectional view of a wavelength converter according to another embodiment of the present invention.
Figure 8:
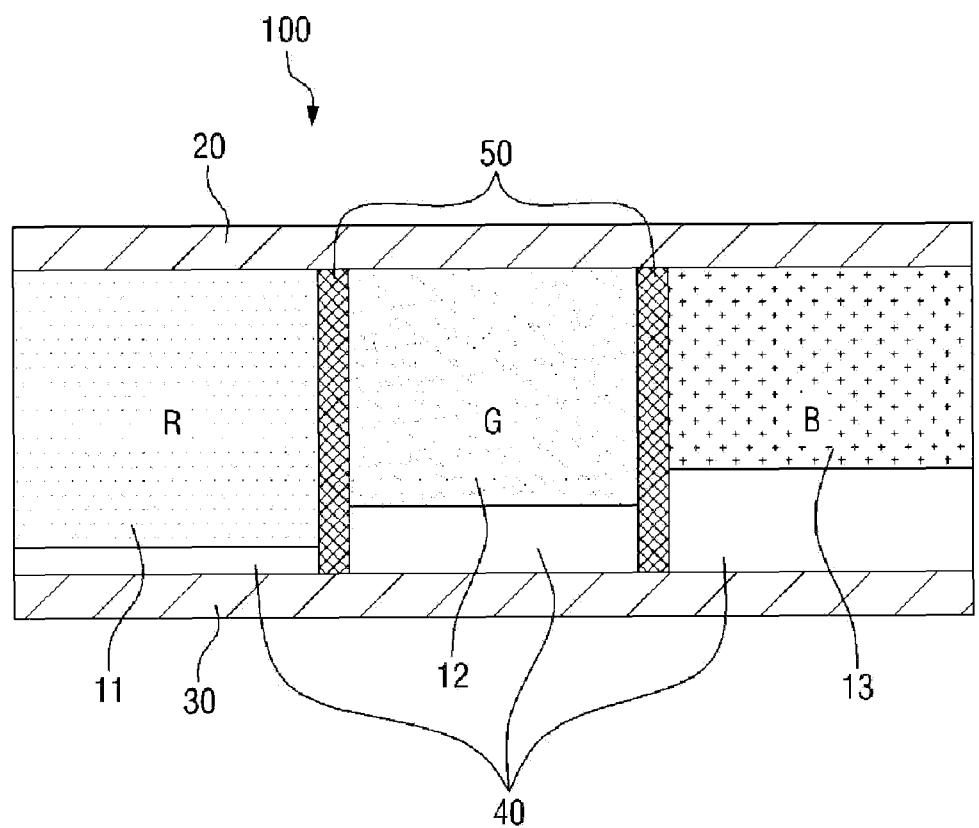
FIG. 8 is a cross-sectional view of a wavelength converter according to another embodiment of the present invention.
Figure 9:
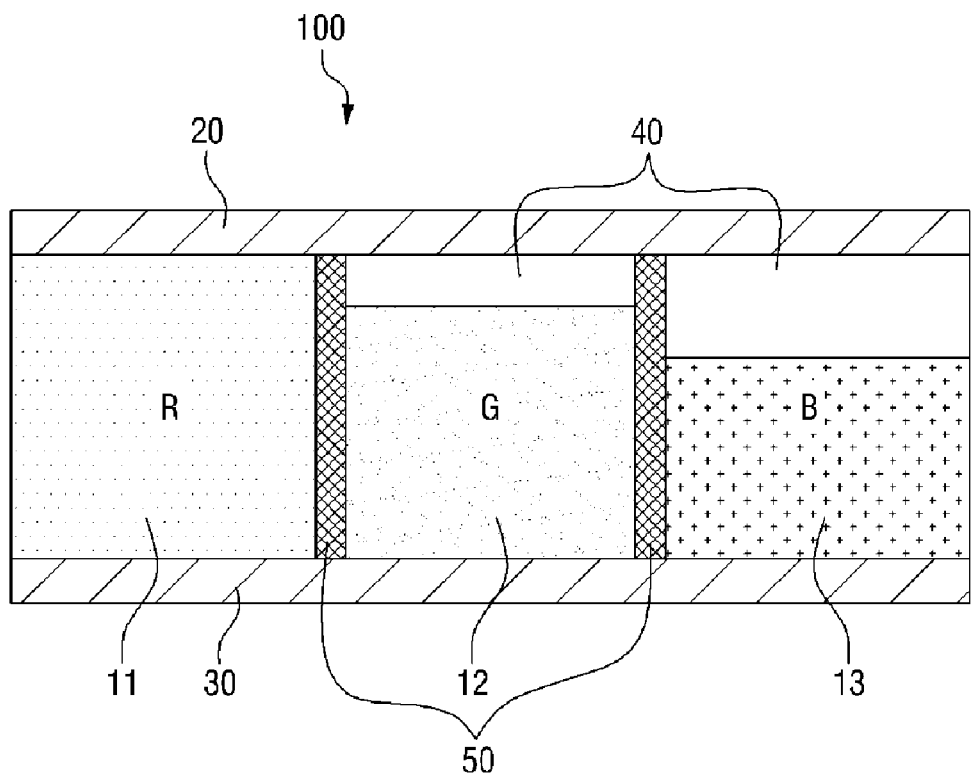
FIG. 9 is a cross-sectional view of a wavelength converter according to another embodiment of the present invention.
Figure 10:
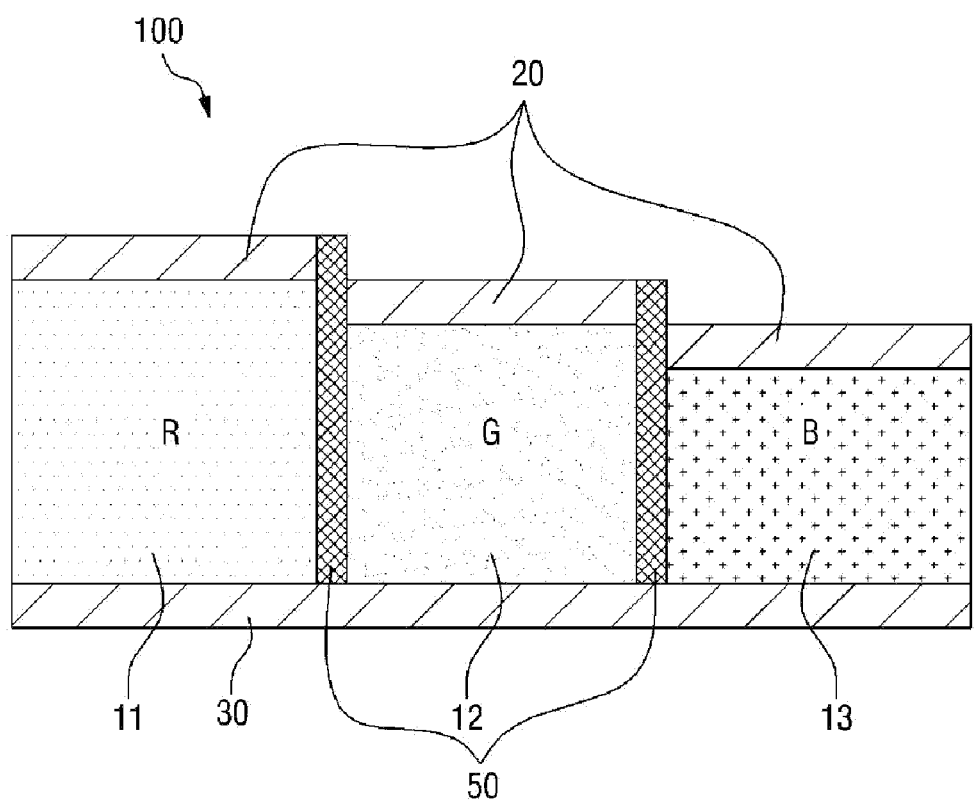
FIG. 10 is a cross-sectional view of a wavelength converter according to another embodiment of the present invention.
Figure 11:
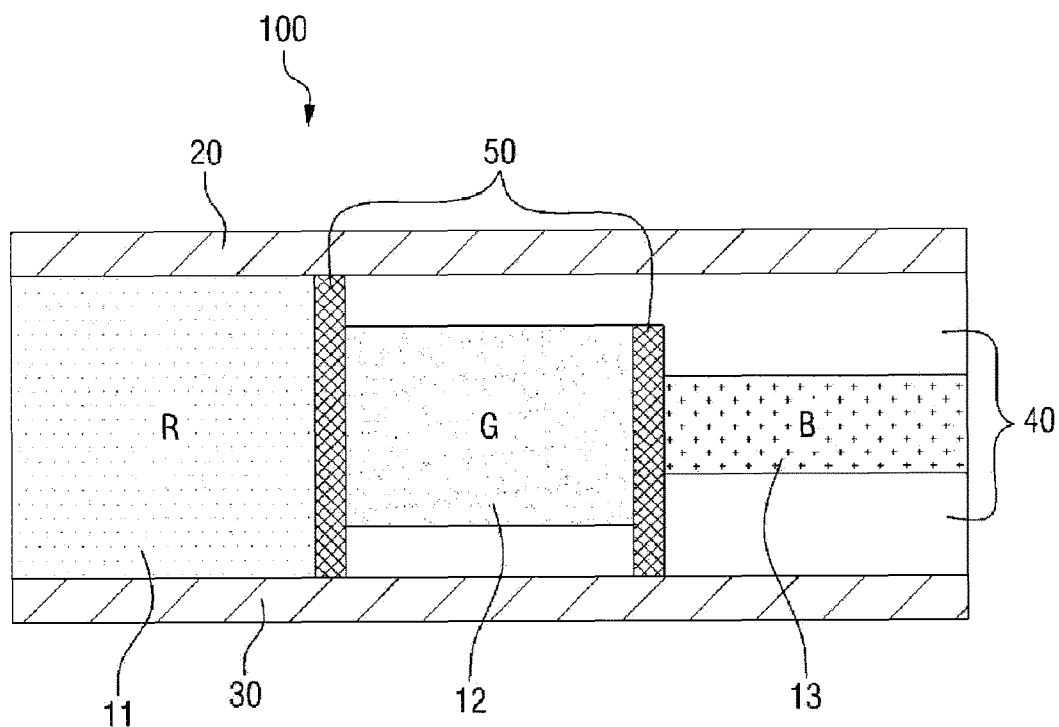
FIG. 11 is a cross-sectional view of a wavelength converter according to another embodiment of the present invention.
Figure 12:
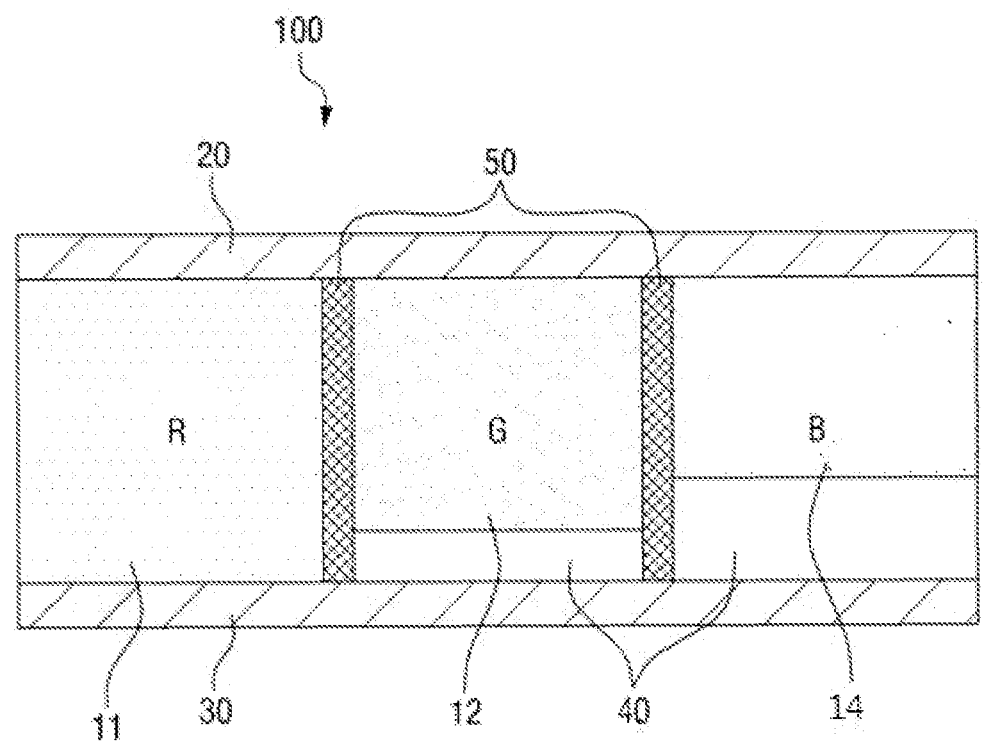
FIG. 12 is a cross-sectional view of a wavelength converter according to another embodiment of the present invention.

As shown in FIG. 6, the wavelength converter 100 may further include a fourth pattern 14 that converts a wavelength of light into blue light and emits the blue light. The first pattern 11, the second pattern 12, and the fourth pattern 14 may be alternately disposed. An optical path length $L_4$ of the fourth pattern 14 may be given by Equation (3):

$$L_4 = (\lambda_4/2) \times m$$

In Equation (3), $L_4$ is the optical path length of the fourth pattern 14, $\lambda_4$ is a wavelength of light converted by the fourth pattern 14, and m is a natural number.

As will be described later, if a blue light-emitting diode (LED) is used as a light source, blue light may enter the wavelength converter 100. The fourth pattern 14, which is formed of a transparent material, may allow the blue light to pass therethrough. That is, the fourth pattern 14 may not include quantum dots or a fluorescent material. As illustrated in FIG. 6, the fourth pattern 14 may be formed only of a transparent material and may not perform wavelength conversion. The transparent material may include a material that contains, e.g., a glass or a polymer resin. The polymer resin may be at least one of an epoxy, a silicone, a polystyrene, and an acrylate. However, any transparent polymer resin can be used as the fourth pattern 14.

The fourth pattern 14 is formed to satisfy the optical path length $L_4$. The fourth pattern 14 is formed of a transparent material to transmit blue light, when the blue light is incident thereto. The structure of the fourth pattern 14 may be the same as the third pattern 13 as shown in FIGS. 1 through 5, except that the fourth pattern 14 is formed of a transparent material.

Since the fourth pattern 14 is also designed to satisfy the optical path length $L_4$, blue light incident on the fourth pattern 14 may emerge from the fourth pattern 14 as blue light having a high purity. The details of the optical path length $L_4$ are the same as the details of the optical path lengths $L_1$, $L_3$, and $L_3$ of the first through third patterns 11, 12, and 13. Thus, a description thereof is omitted.

FIGS. 7 through 12 illustrate other various embodiments of the wavelength converter 100 of the present invention. Wavelength converters 100 of FIGS. 7 through 11 have the same structures as the wavelength converters 100 of FIGS. 1 through 5, except that a barrier rib 50 is additionally provided between a first pattern 11, a second pattern 12, and a third pattern 13. Thus, a detailed description thereof will be omitted. In addition, a wavelength converter 100 of FIG. 12 has the same structure as the wavelength converter 100 of FIG. 6, except that a barrier rib 50 is additionally provided between a first pattern 11, a second pattern 12 and a fourth pattern 14. Thus, a detailed description thereof will be omitted.

The barrier rib 50 may be formed of a reflective material or member. In this case, light incident on each of the first through third patterns 11, 12, and 13 may be reflected within a corresponding pattern only. Thus, light in different regions can be prevented from being mixed. The reflective member of the barrier rib 50 may be a layer formed of a material selected from Ag, Al, Rh, Pd, Pt, Ru, a Pt group element, and alloys of the same.

Figure 13:
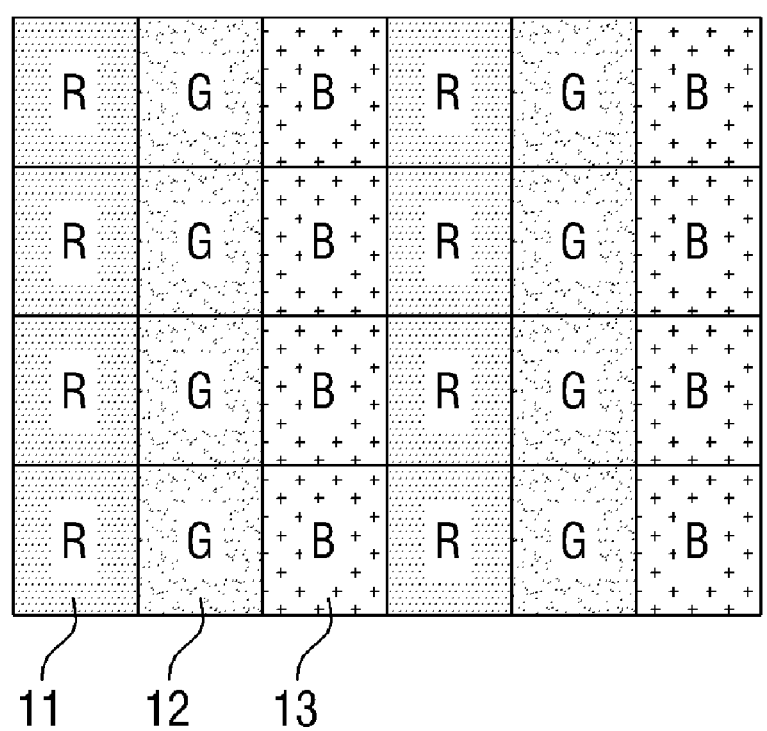
FIG. 13 is a plan view of a wavelength converter according to an embodiment of the present invention.
Figure 14:
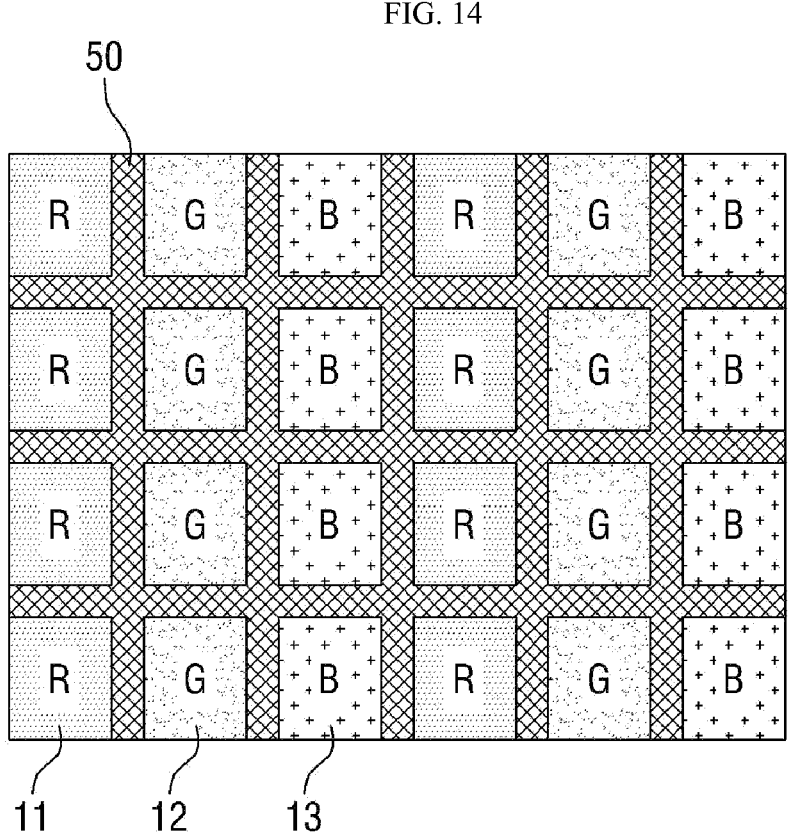
FIG. 14 is a plan view of a wavelength converter according to another embodiment of the present invention.
Figure 15:
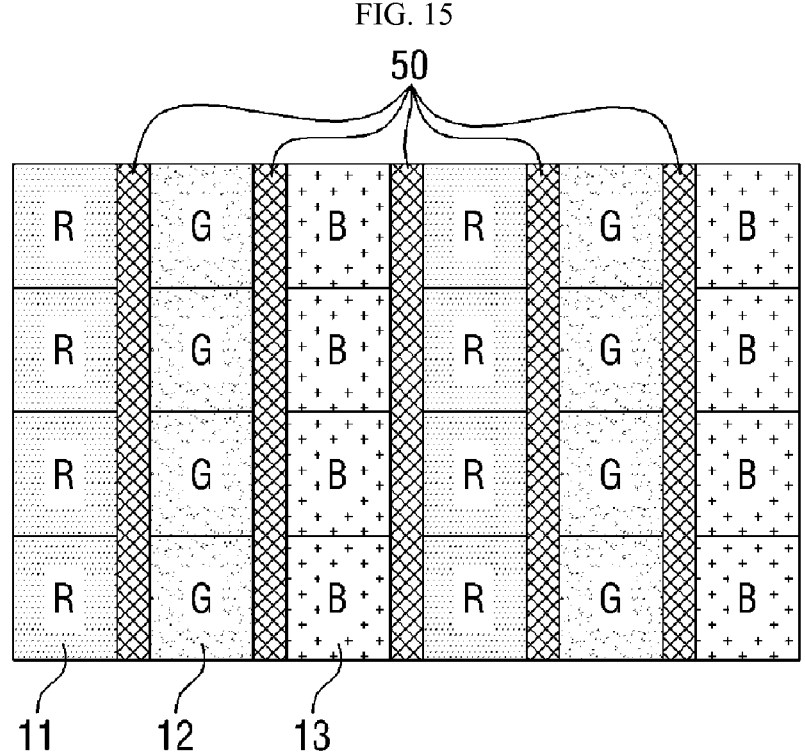
FIG. 15 is a plan view of a wavelength converter according to another embodiment of the present invention.
Figure 16:
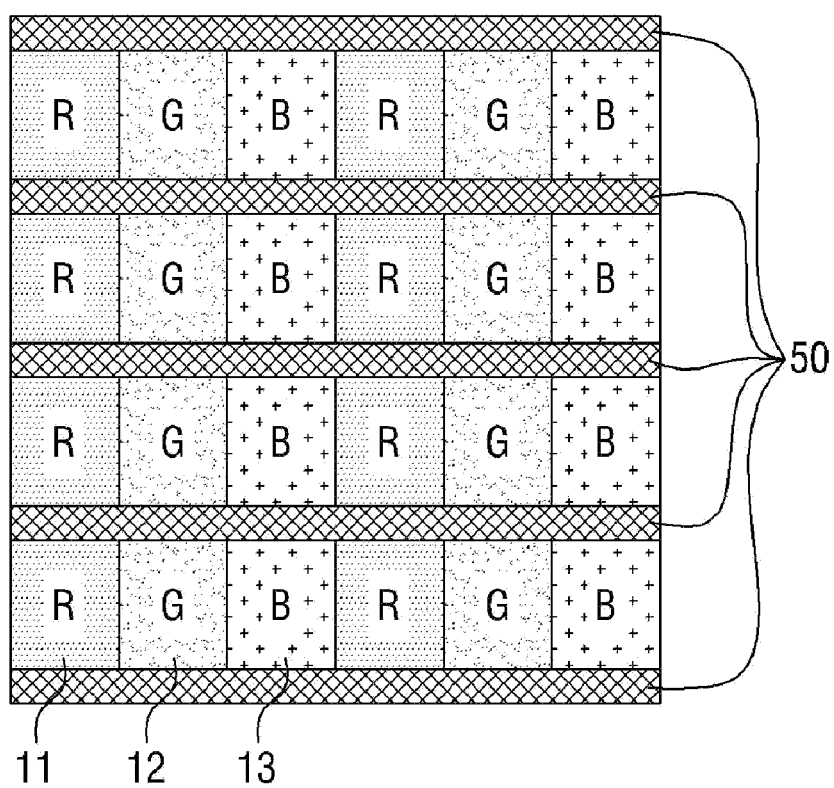
FIG. 16 is a plan view of a wavelength converter according to another embodiment of the present invention.

FIGS. 13 through 16 are plan views of wavelength converters according to embodiments of the present invention. A wavelength converter of the present invention may include first through third patterns 11, 12, and 13 alternately disposed without a barrier rib as illustrated in FIG. 13, or may include a barrier rib 50 between adjacent patterns as illustrated in FIG. 14. In the wavelength converter of FIG. 14, the barrier rib 50 may be formed not only between different types of patterns (i.e., the first through third patterns 11 through 13) but also between the same types of patterns. In the wavelength converter of FIG. 15, the barrier rib 50 may be formed between different types of patterns (i.e., the first through third patterns 11, 12, and 13), but not between the same types of patterns. In the wavelength converter of FIG. 16, the barrier rib 50 may be formed not between different types of patterns (i.e., the first through third patterns 11, 12, and 13) but between the same types of patterns.

Figure 17:
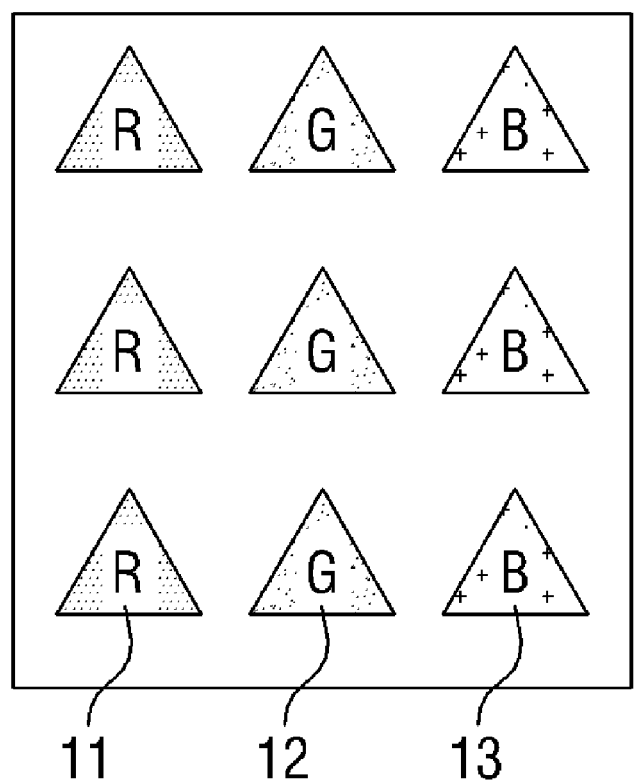
FIG. 17 is a plan view of a wavelength converter for showing a pattern shape according to an embodiment of the present invention.
Figure 18:
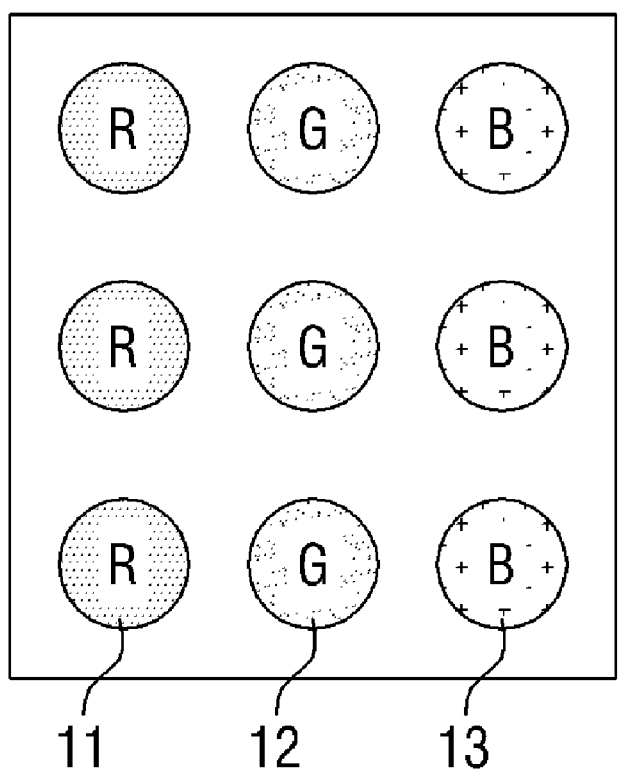
FIG. 18 is a plan view of a wavelength converter for showing a pattern shape according to another embodiment of the present invention.

The planar shape of each of the first through third patterns 11, 12, and 13 of the wavelength converter may be rectangular as illustrated in FIG. 13 through 16, or may be triangular or circular as illustrated in FIGS. 17 and 18. Although not illustrated in the present specification, the planar shape of each of the first through third patterns 11, 12, and 13 may also be a diamond, a trapezoid, or any other suitable shape. Each of the first through third patterns 11, 12, and 13 may also have a combination of the above planar shapes.

Aspects of the present disclosure provide a backlight unit including the wavelength converter. Backlight units are generally classified into edge-type backlight units and direct-type backlight units. In an edge-type backlight unit, a light source is placed on a side of a light guide plate (LGP), which guides light emitted from the light-emitting lamp. Edge-type backlight units are generally applied to relatively small-sized liquid crystal displays (LCDs), such as desktop computers and notebook monitors. Edge-type backlight units have good light uniformity and superior durability, and are advantageous in making devices slimmer. On the other hand, direct-type backlight units have been developed for use in mid- or large-sized displays (20 inches or larger). In a direct-type backlight unit, light sources are arranged under a liquid crystal panel to directly illuminate the front surface of the liquid crystal panel.

A light source of the present invention may be an ultraviolet LED, a blue LED, or a white LED. The ultraviolet LED may have an emission wavelength of 350 to 430 nm, and the blue LED may have an emission wavelength of 430 to 490 nm. The white LED may be manufactured by coating a fluorescent material on a blue LED or an ultraviolet LED.

If the blue LED is used as a light source, the wavelength converter may further include a fourth pattern which emits blue light, in addition to the first pattern 11 and the second pattern 12. The fourth pattern is formed of a transparent polymer material. Therefore, the fourth pattern can increase the purity of blue light emitted from the blue LED, and may emit the blue light with increased purity. The process of increasing the color purity of the blue light using the fourth pattern is the same as the processes of increasing the color purity using the first through third patterns 11, 12, and 13. Thus, a detailed description thereof will be omitted.

Figure 19:
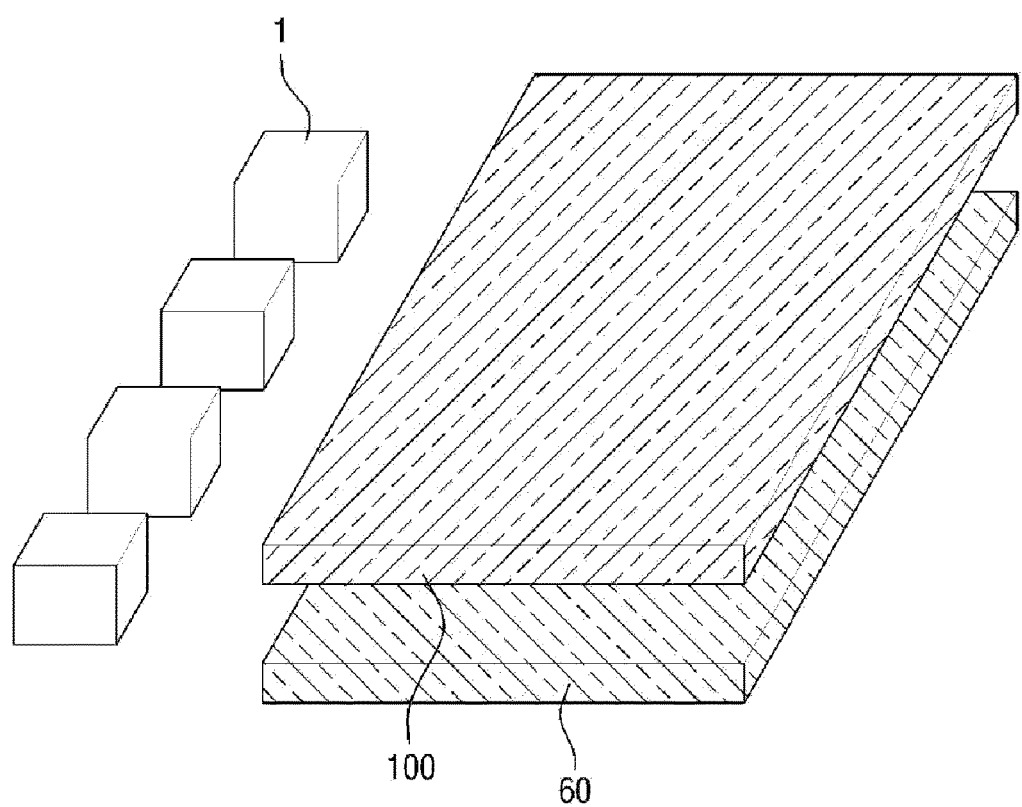
FIG. 19 is a perspective view of a backlight unit including a wavelength converter according to an embodiment of the present invention.

FIG. 19 illustrates a backlight unit according to an embodiment of the present invention. The backlight unit of FIG. 19 may be an edge-type backlight unit in which light sources 1 are disposed on a side of a light guide plate (LGP) 60. The LGP 60 spreads light from point light sources 1 evenly across the surface thereof, while propagating within the LGP 60 by totally reflecting the light a number of times. As a result, the LGP 60 may produce a uniform surface light. The surface light emerging from the LGP 60 may be input to a wavelength converter 100. The LGP 60 may be any LGP commonly used by those of ordinary skill in the art. Thus, a detailed description thereof will be omitted.

Figure 20:
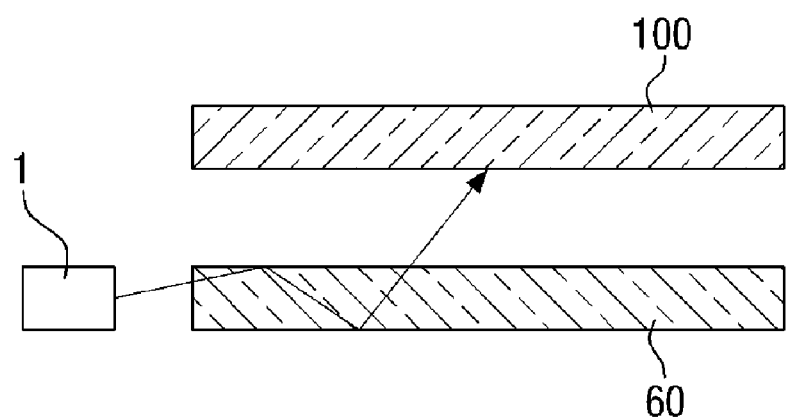
FIG. 20 is a cross-sectional view of the backlight unit of FIG. 19.
Figure 21:
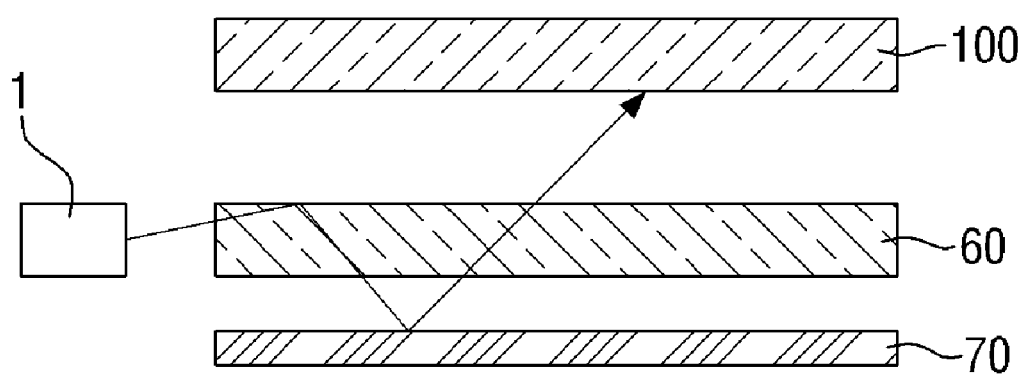
FIG. 21 is a cross-sectional view of the backlight unit of FIG. 20 including a reflective sheet.

FIG. 20 is a cross-sectional view of the backlight unit of FIG. 19. Referring to FIG. 20, light input to the LGP 60 from the light sources 1 is spread uniformly in a surface direction of the LGP 60 and guided by the LGP 60 to the wavelength converter 100 disposed on a top surface of the LGP 60. Referring to FIG. 21, a reflective sheet 70 may be disposed on a bottom surface of the LGP 60, such that light emerging from a bottom surface of the LGP 60 can be reflected by the reflective sheet 70 back to the wavelength converter. The reflective sheet 70 may be formed of a reflective material. The reflective sheet 70 may be any reflective sheet commonly used by those of ordinary skill in the art. Thus, a detailed description thereof will be omitted.

In FIGS. 19 through 21, the light sources 1 are disposed on a side of the LGP 60, and the wavelength converter 100 is disposed on the top surface of the LGP 60. However, the present invention is not limited thereto. For example, the light sources 1 may be disposed on a side of the wavelength converter 100, and the LGP 60 may be disposed on a top surface of the wavelength converter 100. In this case, the reflective sheet 70 may be disposed on a bottom surface of the wavelength converter 100, such that light emerging from the bottom surface of the wavelength converter 100 can be emitted through the top surface of the wavelength converter.

Figure 22:
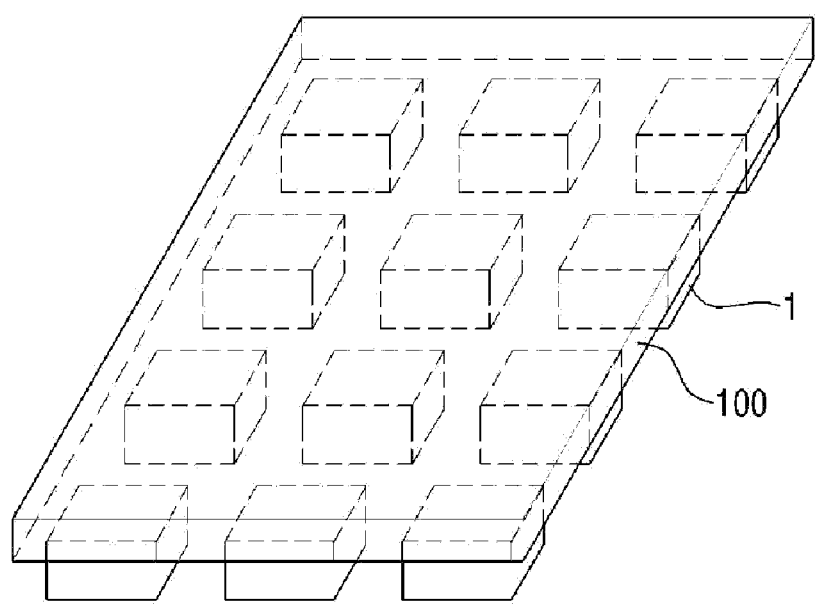
FIG. 22 is a perspective view of a backlight unit including a wavelength converter according to another embodiment of the present invention.
Figure 23:
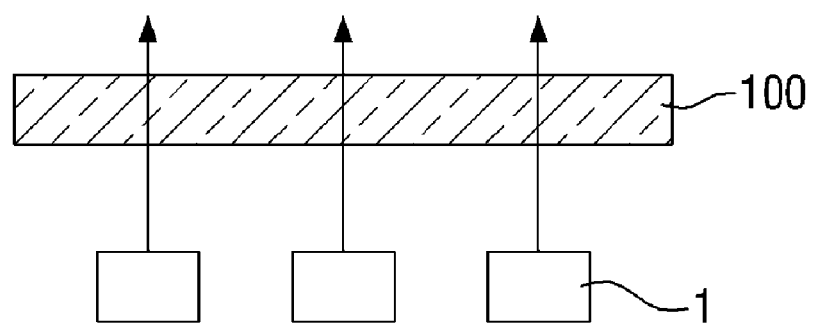
FIG. 23 is a cross-sectional view of the backlight unit of FIG. 22.

FIG. 22 illustrates a backlight unit according to another embodiment of the present invention. The backlight unit of FIG. 22 may be a direct-type backlight unit in which light sources 1 are disposed on a bottom surface of a wavelength converter 100. FIG. 23 is a cross-sectional view of the backlight unit of FIG. 22. Referring to FIG. 22, light may be input directly to the wavelength converter 100 from the light sources 1.

Aspects of the present invention provide an LCD including a light source, a wavelength converter, and an image display unit. The wavelength converter includes a first pattern that converts a wavelength of light into red light, and a second pattern that converts a wavelength of light into green light. The first pattern and the second pattern are alternately disposed. An optical path length $L_a$ of each of the first pattern and the second path may be given by Equation (1):

$$L_a=(\lambda_a/2)\times m$$

In Equation (1), $L_a$ is an optical length of an $a^{th}$ pattern, $\lambda_a$ is a wavelength of light converted by the $a^{th}$ pattern, a is one or two, and m is a natural number.

Figure 24:
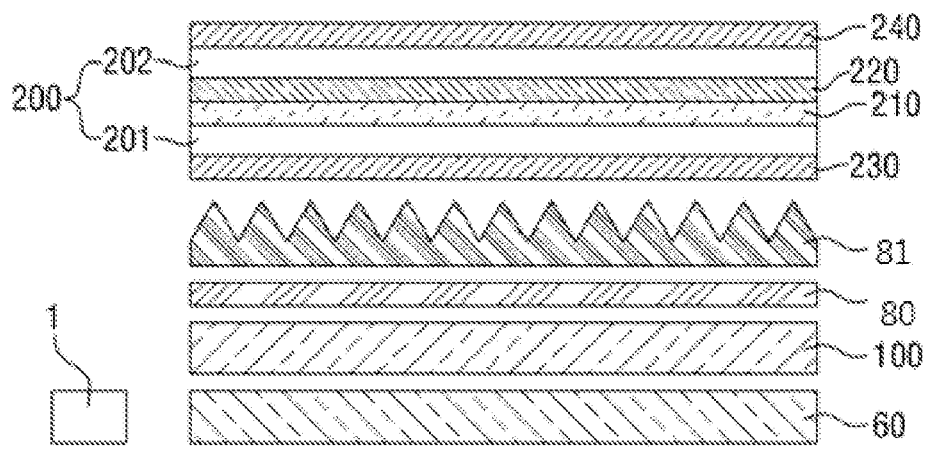
FIG. 24 is a cross-sectional view of a liquid crystal display (LCD) according to an embodiment of the present invention.
Figure 25:
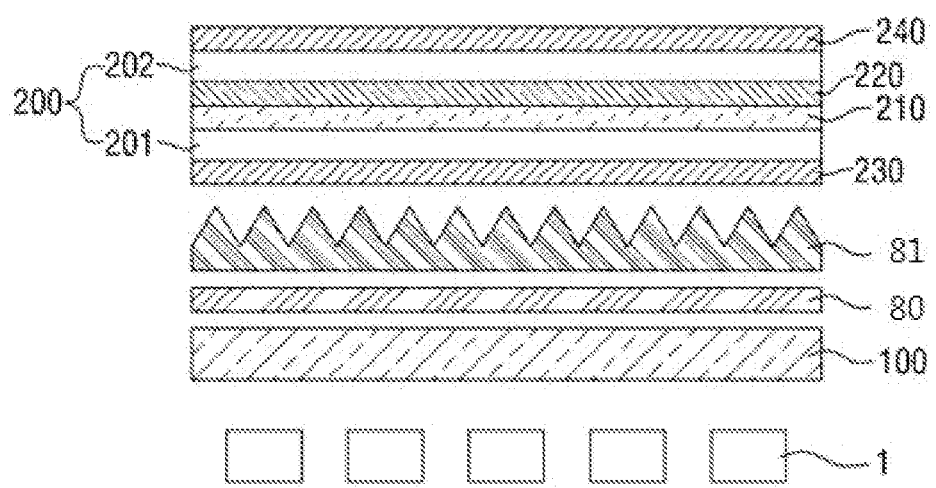
FIG. 25 is a cross-sectional view of an LCD according to another embodiment of the present invention.

FIG. 24 illustrates an LCD according to an embodiment of the present invention, and FIG. 25 illustrates an LCD according to another embodiment of the present invention. The LCD of FIG. 24 is an edge-type LCD, and the LCD of FIG. 25 is a direct-type LCD.

Referring to FIG. 24, light sources 1 are disposed on a side of an LGP 60, and a wavelength converter 100 is disposed on a top surface of the LGP 60. In addition, a diffusion film 80, a prism film 81, and an image display unit 200 are disposed sequentially on the wavelength converter 100. In the image display unit 200, liquid crystals are sealed between two substrates 201 and 202, and an upper polarizer 240 and a lower polarizer 230 are disposed on outer surfaces of the two substrates 202 and 201, respectively. In addition, the image display unit 200 includes a color filter 220 between the two substrates 201 and 202.

Referring to FIG. 25, a wavelength converter 100 is disposed on top surfaces of light sources 1. A diffusion film 80, a prism film 81, and an image display unit 200 are disposed sequentially on a top surface of the wavelength converter 100. In the image display unit 200 of FIG. 24, liquid crystals 210 are sealed between two substrates 201 and 202, and an upper polarizer 240 and a lower polarizer 230 are disposed on outer surfaces of the two substrates 202 and 201, respectively. In addition, the image display unit 200 includes a color filter 220 between the two substrates 201 and 202.

The diffusion film 80 controls light emitted from the wavelength converter 100 to spread evenly across the whole surface thereof, and the prism film 81 concentrates the light spread evenly by the diffusion film 80 onto the front surface of the image display unit 200. In addition, the polarizers 230 and 240 transmit light incident along particular optical axis, and the liquid crystals 210 change the optical axis of the light according to a voltage applied thereto. The color filter 220 allows only desired colors of incident light to pass therethrough, according to a signal, and combines the colors to display a desired image. The image display unit 200, the diffusion film 80 and the prism film 81 are widely known to those of ordinary skill in the art. Thus, a detailed description thereof will be omitted.

The LCD according to the present invention may include another optical film in addition to the diffusion film 80 and the prism film 81, in order to improve optical characteristics thereof. Alternatively, an existing optical film may be removed from the LCD. In some embodiments, two or more optical films of the same type may be used, or the positional relationship among the optical films may be changed. In addition, any one of the polarizers 230 and 240 may be omitted from the image display unit 200, or the positional relationship among the elements within the image display unit 200 may be changed.

According to aspects of the present disclosure, it is possible to provide a wavelength converter that can make a wavelength peak narrow, by reducing a half-width of a wavelength in wavelength bands of red light, green light, and blue light. As such, color mixing is reduced at a wavelength boundary of each color. Accordingly, the wavelength converter can emit light having a high-purity color.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A wavelength converter comprising:
a first pattern configured to convert light emitted from a light source into red light;
a second pattern configured to convert light emitted from the light source into green light;
a first substrate and a second substrate having the first pattern and the second pattern interposed therebetween; and
an optical path adjuster disposed between the second pattern and at least one of the first substrate and the second substrate,
wherein the first pattern and the second pattern are alternately disposed transverse to an optical path, and an optical path length $L_a$ of each of the first pattern and the second pattern is given by Equation (1):

$$L_a=(\lambda_a/2)\times m,$$

wherein $L_a$ is an optical path length of an a-th pattern, $\lambda_a$ is a wavelength of the red or green light converted by the a-th pattern, a is one or two, and m is a natural number, and the optical path length $L_1$ and the optical path length $L_2$ are different from each other, and wherein the optical path length $L_1$ is equal to a sum of the optical path length $L_2$ and an optical path length of the optical path adjuster.

2. The wavelength converter of claim 1, further comprising a third pattern configured to convert light emitted from the light source into blue light,
wherein the first through third patterns are alternately disposed transverse to the optical path, and an optical path length $L_3$ of the third pattern is given by Equation (2):

$$L_3=(\lambda_3/2)\times m,$$

wherein $L_3$ is the optical path length of the third pattern, $\lambda_3$ is a wavelength of the blue light converted by the third pattern, and m is a natural number.

3. The wavelength converter of claim 1, further comprising a fourth pattern that comprises a transparent polymer resin configured to convert light emitted from the light source into blue light,
wherein the first pattern, the second pattern, and the fourth pattern are alternately disposed transverse to the optical path, and an optical path length $L_4$ of the fourth pattern is given by Equation (3):

$$L_4=(\lambda_4/2)\times m,$$

wherein $L_4$ is the optical path length of the fourth pattern, $\lambda_4$ is a wavelength of the blue light converted by the fourth pattern, and m is a natural number.

4. The wavelength converter of claim 2, wherein each of the first, second, and third patterns comprises a fluorescent material or quantum dots.

5. The wavelength converter of claim 4, wherein the fluorescent material comprises at least one selected from the group consisting of a YAG-based fluorescent material, a silicate-based fluorescent material, and an oxynitride fluorescent material.

6. The wavelength converter of claim 4, wherein the quantum dots comprise at least one selected from the group consisting of Si nanocrystals, group II-VI compound semiconductor nanocrystals, group III-V compound semiconductor nanocrystals, and group IV-VI compound semiconductor nanocrystals.

7. The wavelength converter of claim 6, wherein the group II-VI compound semiconductor nanocrystals are selected from the group consisting of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

8. The wavelength converter of claim 6, wherein the group III-V compound semiconductor nanocrystals are selected from the group consisting of GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs.

9. The wavelength converter of claim 6, wherein the group IV-VI compound semiconductor nanocrystals comprise SbTe.

10. The wavelength converter of claim 1,
wherein each of the first substrate and the second substrate are semi-transmissive.

11. The wavelength converter of claim 10, wherein the first substrate and the second substrate comprise at least one selected from the group consisting of $Si_3N_4$, SiO, $WO_3$, ZnS, and $TiO_2$.

12. The wavelength converter of claim 10, wherein at least one of the first substrate and the second substrate is reflective.

13. The wavelength converter of claim 1, wherein the optical path adjuster is semi-transmissive.

14. The wavelength converter of claim 1, wherein the first pattern and the second pattern have planar shapes independently selected from the group consisting of rectangular, triangular, circular, and trapezoidal.

15. A liquid crystal display (LCD) comprising:
a light source;
a wavelength converter; and
an image display unit,
wherein the wavelength converter comprises:
  a first pattern configured to convert light emitted from the light source into red light;
  a second pattern configured to convert light emitted from the light source into green light
  a first substrate and a second substrate having the first pattern and the second pattern interposed therebetween; and
  an optical path adjuster disposed between the second pattern and at least one of the first substrate and the second substrate,
wherein the first pattern and the second pattern are alternately disposed transverse to an optical path, and an optical path length $L_a$ of each of the first pattern and the second pattern is given by Equation (1):

$$L_a = (\lambda_a/2) \times m,$$

wherein $L_a$ is an optical path length of an a-th pattern, $\lambda_a$ is a wavelength of light red or green light converted by the a-th pattern, a is one or two, and m is a natural number, and the optical path length $L_1$ and the optical path length $L_2$ are different from each other, and
wherein the optical path length $L_1$ is equal to a sum of the optical path length $L_2$ and an optical path length of the optical path adjuster.

16. The LCD of claim 15, wherein the wavelength converter further comprises a third pattern configured to convert light emitted from the light source into blue light, wherein the first, second, and third patterns are alternately disposed transverse to the optical path, and an optical path length $L_3$ of the third pattern is given by Equation (2):

$$L_3 = (\lambda_3/2) \times m,$$

wherein $L_3$ is the optical path length of the third pattern, $\lambda_3$ is a wavelength of the blue light converted by the third pattern, and m is a natural number.

17. The LCD of claim 15, wherein the wavelength converter further comprises a fourth pattern that comprises a transparent polymer resin configured to convert light emitted from the light source into blue light,
wherein the first pattern, the second pattern, and the fourth pattern are alternately disposed transverse to the optical path, and an optical path length $L_4$ of the fourth pattern is given by Equation (3):

$$L_4 = (\lambda_4/2) \times m,$$

wherein $L_4$ is the optical path length of the fourth pattern, $\lambda_4$ is a wavelength of the blue light converted by the fourth pattern, and m is a natural number.

18. The LCD of claim 15, wherein the light source comprises a blue light-emitting diode (LED) or a white LED.

19. The LCD of claim 16, further comprising a light guide plate (LGP) disposed on a side of the light source.

20. The wavelength converter of claim 4, wherein the fluorescent material comprises at least one selected from the group consisting of $(Y_{1-x-y}Gd_xCe_y)_3Al_5O_{12}$, $(Y_{1-x}Ce_x)_3Al_5O_{12}$, $(Y_{1-x}Ce_x)_3(Al_{1-y}Ga_y)_5O_{12}$, $(Y_{1-x-y}Gd_xCe_y)_3(Al_{1-z}Ga_z)_5O_{12}$, $(Sr,Ca,Ba,Mg)_2SiO_4$:Eu, $(Ca,Sr)Si_2N_2O_2$:Eu, $Y_3(Al,Ga)_5O_{12}$:Ce, $CaSc_2O_4$:Ce, $Ca_3(Sc,Mg)_2Si_3O_{12}$:Ce, $(Sr,Ba)_2SiO_4$:Eu, $(Si,Al)_6(O,N)_8$:Eu($\beta$-sialon), $(Ba,Sr)_3Si_6O_{12}N_2$:Eu, $SrGa_2S_4$:Eu, $BaMgAl_{10}O_{17}$:Eu,Mn, $(Ca,Sr,Ba)_2Si_5(N,O)_8$:Eu, $(Ca,Sr,Ba)Si(N,O)_2$:Eu, $(Ca,Sr,Ba)AlSi(N,O)_8$:Eu, $(Sr,Ba)_3SiO_5$:Eu, $(Ca,Sr)S$:Eu, $(La,Y)_2O_2S$:Eu, and $K_2SiF_6$:Mn.

* * * * *